United States Patent
Rezagholizadeh et al.

(10) Patent No.: US 11,151,334 B2
(45) Date of Patent: Oct. 19, 2021

(54) SYSTEMS AND METHODS FOR MULTILINGUAL TEXT GENERATION FIELD

(71) Applicants: Mehdi Rezagholizadeh, Montreal (CA); Md Akmal Haidar, Montreal (CA); Alan Do-Omri, Montreal (CA); Ahmad Rashid, Montreal (CA)

(72) Inventors: Mehdi Rezagholizadeh, Montreal (CA); Md Akmal Haidar, Montreal (CA); Alan Do-Omri, Montreal (CA); Ahmad Rashid, Montreal (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 283 days.

(21) Appl. No.: 16/143,128

(22) Filed: Sep. 26, 2018

(65) Prior Publication Data

US 2020/0097554 A1  Mar. 26, 2020

(51) Int. Cl.
G06F 40/58 (2020.01)
G06N 3/08 (2006.01)

(52) U.S. Cl.
CPC ............... *G06F 40/58* (2020.01); *G06N 3/08* (2013.01)

(58) Field of Classification Search
None
See application file for complete search history.

(56) References Cited

U.S. PATENT DOCUMENTS

| | | | | |
|---|---|---|---|---|
| 10,152,970 B1* | 12/2018 | Olabiyi | | G06N 20/00 |
| 10,679,044 B2* | 6/2020 | Vaezi Joze | | G06N 20/00 |
| 2010/0145701 A1* | 6/2010 | Kaneko | | A63F 13/10 |
| | | | | 704/258 |
| 2013/0185061 A1* | 7/2013 | Arvanaghi | | H04K 3/43 |
| | | | | 704/201 |
| 2014/0088964 A1* | 3/2014 | Bellegarda | | G10L 15/063 |
| | | | | 704/243 |
| 2016/0140643 A1 | 5/2016 | Nice et al. | | |
| 2018/0232451 A1* | 8/2018 | Lev-Tov | | G06N 3/08 |
| 2019/0080205 A1* | 3/2019 | Kaufhold | | G06K 9/6257 |
| 2019/0095798 A1* | 3/2019 | Baker | | G06N 3/082 |
| 2019/0103092 A1* | 4/2019 | Rusak | | G06F 40/35 |

(Continued)

FOREIGN PATENT DOCUMENTS

| | | |
|---|---|---|
| CN | 107368475 A | 11/2017 |
| CN | 107590531 A | 1/2018 |
| CN | 108304390 A | 7/2018 |

OTHER PUBLICATIONS

Antoni Valerio Miceli Barone, "Towards cross-lingual distributed representations without parallel text trained with adversarial autoencoder", The University of Edinburgh, Conference Paper Aug. 2016, pp. 121-126.*

(Continued)

*Primary Examiner* — Thuykhanh Le
(74) *Attorney, Agent, or Firm* — BCF LLP

(57) ABSTRACT

In at least one broad aspect, described herein are systems and methods in which a latent representation shared between two languages is built and/or accessed, and then leveraged for the purpose of text generation in both languages. Neural text generation techniques are applied to facilitate text generation, and in particular the generation of sentences (i.e., sequences of words or subwords) in both languages, in at least some embodiments.

10 Claims, 8 Drawing Sheets

(56) References Cited

U.S. PATENT DOCUMENTS

| | | | |
|---|---|---|---|
| 2019/0236148 A1* | 8/2019 | DeFelice | G06F 40/216 |
| 2019/0251612 A1* | 8/2019 | Fang | G06F 16/535 |
| 2019/0251721 A1* | 8/2019 | Hua | G06N 3/08 |
| 2019/0318032 A1* | 10/2019 | Vangala | G06F 16/3329 |
| 2019/0341054 A1* | 11/2019 | Krupka | G10L 17/00 |
| 2019/0392304 A1* | 12/2019 | Aliper | G06N 3/088 |
| 2020/0019699 A1* | 1/2020 | Araujo | G06F 21/57 |
| 2020/0020319 A1* | 1/2020 | Malhotra | G10L 15/063 |
| 2020/0021888 A1* | 1/2020 | de Mello Brandao | G06K 9/00335 |
| 2020/0090049 A1* | 3/2020 | Aliper | G06K 9/6251 |
| 2020/0167914 A1* | 5/2020 | Stamatoyannopoulos | G06N 20/00 |
| 2020/0242964 A1* | 7/2020 | Wu | G09B 7/02 |
| 2020/0311572 A1* | 10/2020 | Baker | G06N 3/0454 |
| 2020/0342879 A1* | 10/2020 | Carbune | G10L 17/22 |

OTHER PUBLICATIONS

Guillaume Lample et al. Unsupervised Machine Translation Using Monolingual Corpora Only, conference paper at ICLR 2018. Apr. 13, 2018, pp. 1-14.

Arjovsky et al., Wasserstein GAN, Courant Institute of Mathematical Sciences and Facebook AI Research, pp. 1-28 and three sheets of examples.

Artetxe et al., Learning Principled Bilingual Mappings of Word Embeddings While Preserving Monolingual Invariance, Proceedings of the 2016 Conference on Empirical Methods in Natural Language Processing, Nov. 1-5, 2016, pp. 2289-2294, Association for Computational Linguistics, Austin, USA.

Artetxe et al., Learning Bilingual Word Embeddings With (almost) No Bilingual Data, Proceedings of the 55th Annual Meeting of the Association for Computational Linguistics, Jul. 30-Aug. 4, 2017, pp. 451-462, Association for Computational Linguistics, Vancouver, Canada.

Artetxe et al., Generalizing and Improving Bilingual Word Embedding Mappings with a Multi-Step Framework of Linear Transformations, 2018, Association for the Advancement of Artificial Intelligence.

Artetxe et al., Unsupervised Neural Machine Translation, Published as a conference paper at ICLR 2018, pp. 1-12.

Bahdanau et al., Neural Machine Translation by Jointly Learning to Align and Translate, Published as a conference paper at ICLR 2015, pp. 1-15.

Cho et al., On the Properties of Neural Machine Translation: Encoder-Decoder Approaches, University of Montreal.

Conneau et al,, Word Translation Without Parallel Data, Published as a conference paper at ICLR 2018, pp. 1-14.

Gulrajani et al., Improved Training of Wasserstein GANs, pp. 1-11.

Kalchbrenner et al., Recurrent Continuous Translation Models, Proceedings of the 2013 Conference on Empirical Methods in Natural Language Processing, Oct. 18-21, 2013, pp. 1700-1709, Association for Computational Linguistics, Seattle, USA.

Zhao et al., Adversarially Regularized Autoencoders, Proceedings of the 35 th International Conference on Machine Learning, 2018, Stockholm, Sweden.

Lample et al., Unsupervised Machine Translation Using Monolingual Corpora Only, Published as a conference paper at ICLR 2018, pp. 1-14.

Li et al., Adversarial Learning for Neural Dialogue Generation, Stanford University, New York University and Ohio State University, pp. 1-13.

Salimans et al., Improved Techniques for Training GANs, 30th Conference on Neural Information Processing Systems (NIPS 2016), pp. 1-9, Barcelona, Spain.

Sennrich et al., Improving Neural Machine Translation Models with Monolingual Data, The research presented in this publication was conducted in cooperation with Samsung Electronics Polska sp. z o.o.—Samsung R&D Institute Poland.

Sutskever et al., Sequence to Sequence Learning with Neural Networks, GOOGLE, pp. 1-9.

Vaswani et al, Attention is All You Need, 31st Conference on Neural Information Processing Systems (NIPS 2017), pp. 1-11, Long Beach, USA.

Vincent et al., Presentation: Extracting and Composing Robust Features with Denoising Autoencoders, University of Montreal, Jul. 2018.

Wu et al., Adversarial Neural Machine Translation, School of Data and Computer Science—Sun Yat-sen University, University of Science and Technology of China, Microsoft Research Asia and Guangdong Key Laboratory of Information Security Technology, pp. 1-11.

Yang et al., Improving Neural Machine Translation with Conditional Sequence Generative Adversarial Nets, Institute of Automation—Chinese Academy of Sciences and University of Chinese Academy of Sciences, pp. 1-10.

Yang et al., Semi-Supervised QA with Generative Domain-Adaptive Nets, School of Computer Science—Carnegie Mellon University, pp. 1-11.

Zhao et al., Adversarially Regularized Autoencoders for Generating Discrete Structures, Submitted to 31st Conference on Neural Information Processing Systems (NIPS 2017), pp. 1-13, Long Beach, USA.

Koehn, Europarl: A Parallel Corpus for Statistical Machine Translation, School of Informatics, University of Edinburgh, Scotland, Retrieved From http://homepages.inf.ed.ac.uk/pkoehn/publications/europarl-mtsummit05.pdf on May 10, 2019.

Wikipedia, Naive Bayes classifier, Edited on Apr. 30, 2019, retrieved from https://en.wikipedia.org/wiki/Naive_Bayes_classifier on May 10, 2019.

* cited by examiner

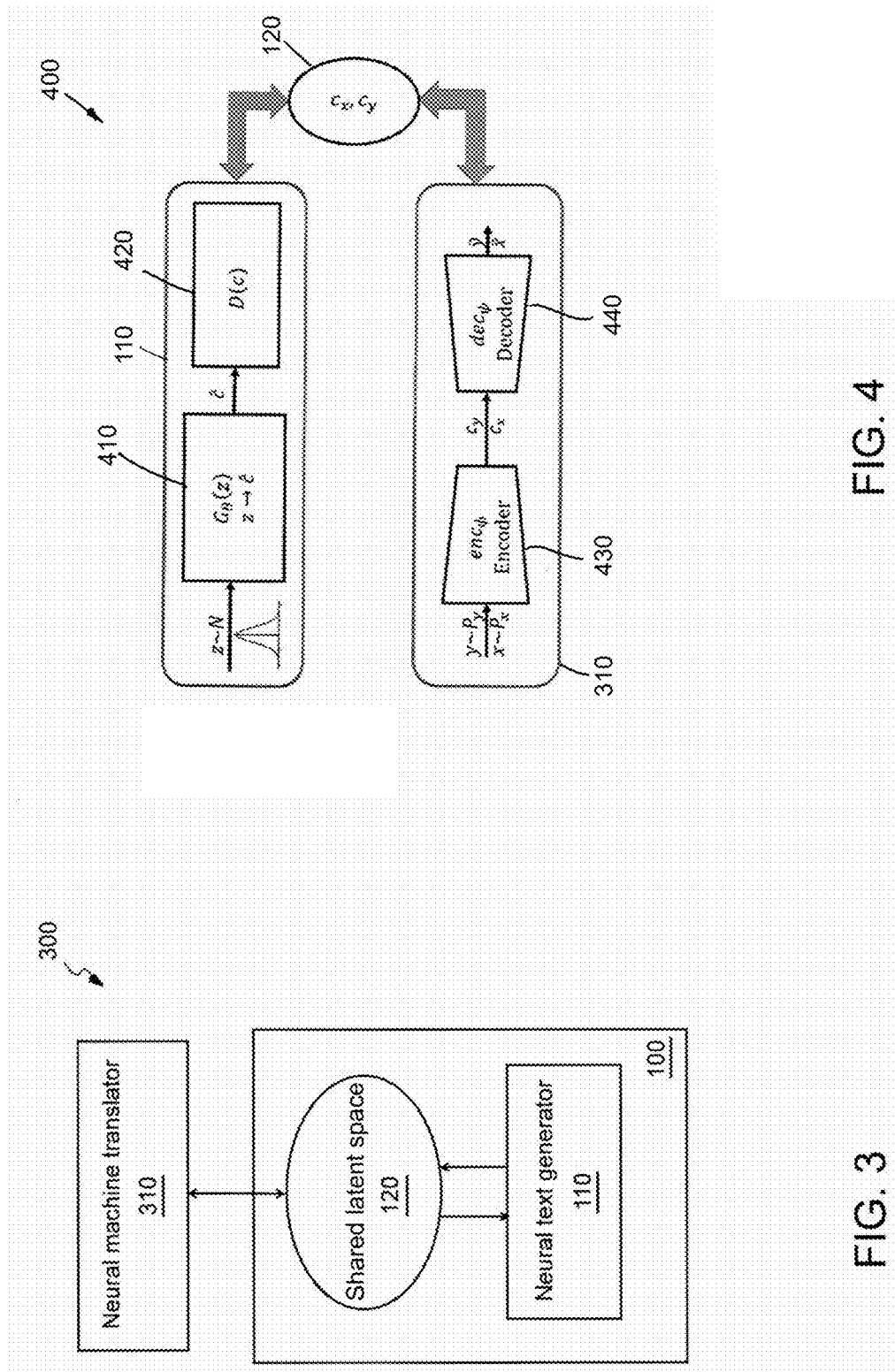

SYSTEMS AND METHODS FOR MULTILINGUAL TEXT GENERATION

FIELD

Embodiments described herein relate generally to text processing and, more particularly, to systems and methods for generating text in at least two languages.

BACKGROUND

The processing of human languages (e.g., English, French, German, etc.) by a computing device is often referred to generally as "natural language processing". One example of a natural language processing application is known as machine translation. Machine translation is generally performed using a machine translation computer system that includes at least one processor configured to receive, as input, a sentence in one human language, processes the sentence, and to output a sentence that expresses the same or a similar concept in another human language. Translation of sentences from one language to another, may be rather easy for a skilled human translator to perform; however, as text in a given language can often be ambiguous, and due to other factors, programming a computing device to perform the sentence translation from one language to another language both accurately and efficiently may be challenging.

Despite such challenges, a wide variety of machine translation computer systems are presently available. Many natural language processing applications, including those relating to translation, are based on language models that define a probability distribution over, for example, sequences of words. Moreover, techniques that are specialized for processing sequential data are often used.

At least some machine translation computer systems employ artificial neural networks ("neural networks") to perform machine translation. Broadly, the term "neural machine translation" is used to describe approaches to machine translation that use neural networks. Various types of neural networks are known in the art.

SUMMARY

In a broad aspect, described herein are systems and methods in which certain data structures, conventionally having utility at least in the field of machine translation, are adapted in a novel and inventive manner for an additional and/or alternative use, namely the generation of text. In at least some example embodiments, sentences that express a particular concept are capable of being generated in two different human languages in a manner that may be more closely analogous to the way in which a truly bilingual person would perform the task.

According to one aspect of the present disclosure, there is provided a computing system for concurrently generating parallel sentences in at least two languages, the system comprising a neural machine translator for learning a shared latent space of the at least two languages, the neural machine translator comprising: an encoder configured to generate coded representations of sentences in the at least two languages and map the coded representations to the shared latent space; and a decoder configured to decode the coded representations to generate sentences in any one of the at least two languages; and a generative adversarial network (GAN) comprising a generator and a discriminator, the generator configured to receive noise and generate a coded representation, conditioned on the noise, that mimics a coded representation included in the shared latent space, the discriminator configured to provide feedback to the generator for use in learning to generate the coded representations.

Optionally, in any of the preceding aspects, a further implementation of the aspect provides that the discriminator is configured to help the generator learn the shared latent space by: receiving a generated representation from the generator; receiving a coded representation of a sentence by the encoder; the discriminator producing a confidence score on the origin, whether generated or encoded from real text, of the generated and latent representations.

Optionally, in any of the preceding aspects, a further implementation of the aspect provides that at least one loss function is employed that is indicative of the discriminator's ability to recognize the origin of the generated coded representation and received coded representation.

Optionally, in any of the preceding aspects, a further implementation of the aspect provides that at least one loss function is employed that is indicative of the generator's ability to fool the discriminator.

According to one aspect of the present disclosure, there is provided a method of training the computing system, comprising: training the machine learning engine; subsequently training the GAN.

According to one aspect of the present disclosure, there is provided a method of training the computing system, comprising: alternating between the training of the machine learning engine and the GAN.

According to one aspect of the present disclosure, there is provided a method of training a sentence generator, the sentence generator implementing a machine learning algorithm (MLA) for concurrently generating sentences in a first language and a second language, the method executable by at least one processor of a computing system having: a trained MLA based on a translation neural network, the translation neural network operable to share access to a multi-dimensional space comprising mapping vectors, the mapping vectors configured to facilitate a translation process between the first and second languages; the sentence generator based on a generator neural network, the generator neural network trainable based on a model of the multi-dimensional space, and configured, in operation, to concurrently generate sentences in response to a query for which a response is encodable to at least one vector for the multi-dimensional space, the model having been generated by the system; the method comprising: feeding the sentence generator an input object; using the model of the multi-dimensional space, generating a predicted vector representing the input object; obtaining, based on the model of the multi-dimensional space, an actual vector representing the input object; using a discriminator to generate a loss function based on a comparison of the predicted vector and the actual vector; and using the loss function for training the sentence generator.

Optionally, in any of the preceding aspects, a further implementation of the aspect provides that the method further comprises generating the model of the multi-dimensional space.

Optionally, in any of the preceding aspects, a further implementation of the aspect provides that the model, having been generated by the system, was generated by: feeding a test object to the translation neural network; receiving a first vector for the multi-dimensional space, the first vector having been generated from text in a first language; receiving a second vector for the multi-dimensional space, the second vector having been generated from text in a second language; generating by the discriminator a loss function, the generating being based on a comparison of the first vector and the second vector.

Optionally, in any of the preceding aspects, a further implementation of the aspect provides that the test object is random noise, and the training is for unconditional text generation.

Optionally, in any of the preceding aspects, a further implementation of the aspect provides that the input object is selected for a given purpose, and wherein the training is for conditional text generation.

Optionally, in any of the preceding aspects, a further implementation of the aspect provides that the input object is random noise, and the training is for unconditional text generation.

According to one aspect of the present disclosure, there is provided a method of training a computing system for generating text in a plurality of languages, the method comprising: accessing a latent space, the latent space encoding text for the plurality of languages such that a sample of the latent space provides a coded representation for a sentence, the coded representation capable of being concurrently decodable to a corresponding sentence in each language of the plurality of languages; sampling the latent space to obtain a plurality of first codes; generating, by a generator, a plurality of second codes; training a discriminator, wherein the discriminator comprises a discriminator neural network for differentiating between the first codes and the second codes; wherein the training the generator and discriminator comprises repeating the sampling and the generating until a stopping criterion is reached; and wherein after the discriminator is trained, the computer system is capable of further sampling the latent space to obtain an output code, the output code being decodable into a corresponding output sentence for each of at least one language of the plurality of languages.

Optionally, in any of the preceding aspects, a further implementation of the aspect provides that the stopping criterion is reached when the discriminator is unable to correctly identify the first codes as having been sampled from the latent space, and when the discriminator is unable to correctly identify the second codes as having been generated by the generator.

Optionally, in any of the preceding aspects, a further implementation of the aspect provides that the method further comprises: training the generator, wherein the generator comprises a generator neural network for learning a model of the latent space; wherein the plurality of second codes is generated by the code generator based on a learned model of the latent space.

Optionally, in any of the preceding aspects, a further implementation of the aspect provides that the method further comprises: sampling the latent space to obtain the output code; and decoding the output code into the corresponding output sentence for each of the at least one language.

Optionally, in any of the preceding aspects, a further implementation of the aspect provides that the method further comprises: receiving an input sentence in a first language to translate; encoding the input sentence to obtain the output code, wherein the output code corresponds to the input sentence; and decoding the output code into the corresponding output sentence for at least one language other than the first language.

Optionally, in any of the preceding aspects, a further implementation of the aspect provides that the method further comprises building the latent space, wherein the building comprises: training at least one autoencoder, the at least one autoencoder comprising at least one encoder neural network; wherein an output of the at least one encoder neural network comprises a set of coded representations of sentences in each of the plurality of languages.

Optionally, in any of the preceding aspects, a further implementation of the aspect provides that the at least one autoencoder comprises at least one decoder neural network, and wherein the method further comprises: sampling the latent space to obtain the output code; and decoding, by the at least one decoder neural network, the output code into the corresponding output sentence for each of the at least one language.

Optionally, in any of the preceding aspects, a further implementation of the aspect provides that the plurality of languages is exactly two natural languages.

Additional and/or alternative features, aspects, embodiments, and advantages of implementations of the present invention will become apparent from the following description, the accompanying drawings and the appended claims.

BRIEF DESCRIPTION OF THE DRAWINGS

For a better understanding of the present invention, as well as other aspects and further features thereof, reference is made to the following description which is to be read in conjunction with the accompanying drawings, where:

FIG. 3 is a block diagram illustrating components of a system for generating text, the system comprising a neural machine translator, as contemplated in some non-limiting embodiments of the present invention;

FIG. 4 is a block diagram further illustrating components of the system of FIG. 3 in accordance with at least one example implementation;

DESCRIPTION

Figure 1:
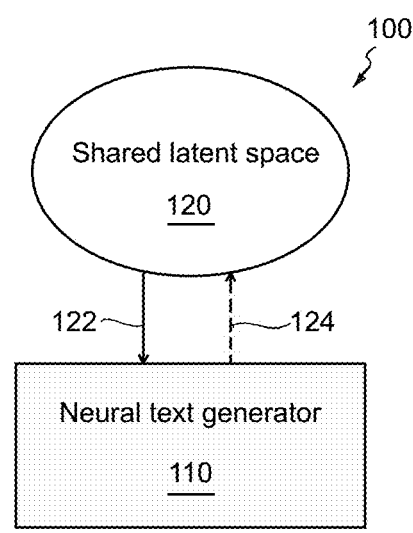
FIG. 1 is a block diagram illustrating components of a system for generating text as contemplated in some non-limiting embodiments of the present invention.

In the field of neural machine translation, "sequence-to-sequence learning" refers generally to a technique in which a model is trained to convert sequences from one domain, to sequences in another domain. In one example application, a source object, such as a sequence of words in a first language (e.g. English), is mapped to a target object, such as a sequence of words in a second language, using an encoder-decoder architecture. The encoder comprises a neural network that maps the sequence of words in the first language into a representation in a shared latent space that captures the meaning of the corresponding sentence; the decoder comprises a neural network that maps a representation in the shared latent space into the sequence of words in the second language. In this manner, machine translation computing systems can be trained (or learn) to translate sentences from one language to one or more other languages, with the representations in a shared latent space expressing intermediate, semantic representations of the sentences.

Models that can accommodate the translation of variable-length input sequences (e.g., sentences) to corresponding variable-length output sequences are generally considered to be more flexible as compared to models that require input sequences to be of a fixed length. As recurrent neural networks (RNNs), which refer to a family of neural networks for processing sequential data, can accommodate variable-length input and output sequences, they can be used in applications where sentences are to be translated from one language to another. Models that can accommodate input sequences (and output sequences) of different length are preferable since the lengths of input sentences are expected to vary. However, known RNN-based systems for machine translation may be difficult to train (e.g., requiring careful tuning of hyperparameters, large amounts of training data, etc.). Further, this training process may not be readily amenable to parallelization.

Moreover, in numerous conventional neural machine translation systems, a given neural network is trained and configured to perform translations of sentences from one language to another, but not vice-versa. Put another way, conventional machine translation engines function unidirectionally. As a result, where translation in the reverse direction is also desired, a separate neural network might be independently trained and configured to perform the translations of sentences in the reverse direction. This may affect the accuracy and/or consistency of sentence translations between the two languages.

Recently, Lample et al., in their 2017 publication "Unsupervised Machine Translation Using Monolingual Corpora Only" (hereinafter "Lample"), the contents of which are herein incorporated by reference, describe one example of a model usable to perform bidirectional translation. Lample discloses a method that takes sentences from monolingual corpora in two different languages and uses them to build a common or "shared" latent space, comprising codes to which de-noised vector input sentence representations that have been produced by an encoder of an autoencoder are mapped. Lample teaches training the model to reconstruct sentences in a given language from noisy versions thereof, as well as to reconstruct a source sentence in one language given a noisy translation of the same sentence in the other language and vice-versa. Lample also teaches that representations of both source and target sentences ("latent representations") within the latent space are to be constrained to have the same distribution using an adversarial regularization loss, whereby the model tries to fool a discriminator that is simultaneously trained to identify the language associated with a given latent representation for a sentence, in a procedure that is iteratively repeated. This is purported to result in translation models of increasing quality. Applicants assert, however, that an improvement in performance is not guaranteed.

Furthermore, Applicants recognized that the bidirectional machine translation functions facilitated by a shared latent space, such as that taught by Lample, may not fully reflect the capabilities of a truly bilingual person. A bilingual person can be considered as someone who is a native speaker of two languages and who is able to think in the two languages equally well, such that the person is capable not only of translating a sentence between the two languages but also of expressing a concept in both languages, accurately and with relative ease. Another answer to the question of what capabilities might be attributable to a bilingual person may be found in neuroscience; the ability for a human to express concepts need not be limited to the generation of language but may also involve mastery of multiple languages.

In at least one broad aspect, described herein are systems and methods in which a latent space shared between two or more languages is built and/or accessed, and then leveraged for the purpose of text generation in the two or more languages. Neural text generation techniques are applied to facilitate text generation, and in particular the generation of text in the form of sentences comprising sequences of words or subwords in the two or more languages, in at least some embodiments. In certain embodiments, both text generation and machine translation are facilitated.

Neural text generation (NTG) techniques and neural machine translation (NMT) techniques have been employed to perform tasks related to text generation and text translation, respectively; these two tasks have been conventionally treated as independent of each other. Accordingly, known machine translation techniques for building and/or accessing a shared latent space may not have considered how the shared latent space might be adapted to facilitate its use in other use applications, such as text generation. Applicants, however, recognized the potential for unifying the two tasks of machine translation and text generation for the purpose of concurrent text generation in at least two languages.

Thus, in at least some embodiments, a neural text generator is provided and trained to learn a manifold of a shared latent space between at least two languages (e.g., as built according to Lample, or of some other multidimensional latent feature space) in order to facilitate sampling of the shared latent space for at least the purpose of concurrent text generation in the two languages. Text in both languages may be generated "concurrently" in the sense that a sample read from the shared latent space provides a requisite latent representation (e.g. a code) that can be decoded to produce a corresponding text (e.g. a sentence comprising a sequence of words) in each of the two languages, rather than requiring, for instance, that a sample be read from each of two separate latent spaces corresponding to the two different languages, respectively, in order to perform bilingual text generation. More specifically, by reading a sample from the shared latent space, a single latent representation (e.g. a single code) is obtained that is valid for both languages. The single latent representation (e.g. the single code) can be passed to a decoder to obtain, for example, a sentence, in either language. In this manner, "concurrent" refers to the fact that a single code is obtained that can be decoded to produce sentences in each of the at least two languages at the same time because the single code itself achieves such a purpose.

In another broad aspect, an encoder is utilized that encodes sequentially. At each of multiple time steps, the encoder receives an embedding vector and produces a code. An embedding vector received at each time step is encoded into a low-dimensional vector that represents a current word of the sentence, and all previous words of the sentence, but emphasizes the most recently received words. The text generator described herein can be configured to generate codes that mimic the output of the encoder to enable training of a generative adversarial network (GAN) to generate sentences in multiple languages.

Referring now to FIG. 1, there is depicted a block diagram illustrating components of a computing system for generating text (e.g. a sequence of words) in two or more languages, shown generally as system 100, in accordance with at least one non-limiting embodiment of the present invention. It is to be expressly understood that the system 100 as depicted is merely an illustrative implementation of the present invention. Thus, the description thereof that follows is intended to be only a description of illustrative examples of the present invention. This description is not intended to define the scope or set forth the bounds of the present invention. In some cases, what are believed to be helpful examples of modifications to the system 100 may also be set forth herein. This is done merely as an aid to understanding, and, again, not to define the scope or set forth the bounds of the present invention.

In a broad aspect, system 100 is directed to an improved text generator capable of generating text in two or more languages by leveraging latent representations (e.g. codes) included in a shared latent space of the two languages, wherein sampling latent representations from the shared latent space produces one or more codes that can be decoded, e.g., using an appropriate decoder, into corresponding sentences in either of the two languages. System 100 may also be referred to generally as a "text generator system" herein, which can be implemented in a computing system or device such as that depicted in FIG. 9. In at least one embodiment, text generator comprises a neural text generator 110 configured to generate text (e.g. a sequence of words in two or more languages), potentially based on a given input provided thereto. As its name suggests, and as will be described in greater detail below, neural text generator 110 may be implemented using at least one neural network and may be trained to accurately generate text (e.g. sequences of words) in two or more languages.

Neural text generators find applications in various domains. For instance, some known neural text generators have been used for generating text in accordance with a certain writing style. To that end, the neural text generator first undergoes a training phase in which a training data set is used for training thereof. For example, the training data set may be excerpts of a given book such that, through training, the neural text generator learns to emulate a writing style used in the book (e.g., emulating the writing style of the book's author). Other applications for neural text generators include, for example, implementing "chatbots" that are configured to respond to user text input as if in dialogue with a user.

In accordance with at least one embodiment, neural text generator 110 comprises a generative adversarial network (GAN). In one example implementation, the GAN comprises two neural networks that operate in contest with one another in a zero-sum game framework. More specifically, as will be further described by way of example with reference to FIG. 4, neural text generator 110 comprises a generator and a discriminator, each of which is implemented by a respective neural network. The generator may be initially configured to randomly sample from a prior distribution (e.g., a multivariate normal distribution representing random noise) and perform mappings to generate new data instances, forming a generated distribution. As the generator is trained, the generated distribution, it is expected, will converge to a data distribution of interest. To achieve this result, for its part the discriminator is configured to discern real samples from the data distribution of interest from the new data instances generated by the generator module. The generator and the discriminator learn to improve one another's respective generative and discriminative performances in an adversarial manner. To that end, an adversarial loss function (or more generally, some objective function) may be employed in training the generator and the discriminator.

Referring again to FIG. 1, text generator system 100 further comprises, or is otherwise provided access to, a shared latent space 120 in which coded representations (also referred to as "low-level", "hidden", "compressed", "latent" or "reduced-dimension" representations) of text (e.g. sequences of words such as sentences), are mapped. Shared latent space 120 is "shared" in that it includes coded representations from which sentences in at least both a first language L1 (e.g., English) and a second language L2 (e.g., French) can be generated using a decoder, where the coded representations of parallel sentences (i.e., given two sentences s1 and s2 in different languages, s1 and s2 are parallel if s1 is the translation of s2 and s2 is the translation of s1—intuitively, sentences s1 and s2 have the same or similar meaning) in either language are mapped proximate to or aligned with one another in the shared latent space 120 so that a coded representation of parallel sentences in the shared latent space 120 may be readily decoded using an appropriate decoder to generate either sentence s or sentence s2. In particular, in at least one embodiment described herein, shared latent space 120 includes code-based representations of sentences in multiple languages (e.g., a sentence in a first language L1 and sentence in a second language L2) such that when a coded representation is sampled from shared latent space 120, the sampled coded representation is capable of being concurrently decoded to a sentence in each of the multiple languages.

In at least one implementation, the code-based representations take the form of real-valued vectors (also referred to herein as "mapping vectors") that can be used when processing translation requests between the first language L1 and the second language L2; additionally, in accordance with embodiments described herein, decoding a given code-based representation (e.g., vector) from that shared latent space 120 into both the first language L1 and the second language L2 produces parallel sentences in the first and second languages L1, L2. More specifically, the parallel sentences can be obtained by decoding a coded representation in the form of a single vector. As the vectors can be regarded as a point in a space with multiple dimensions, shared latent space 120 may also be referred to herein generally as a "multi-dimensional space".

It is contemplated that, in variant embodiments, shared latent space 120 could map coded representations of sentences into more than two languages (e.g., three, four, five languages etc.).

Prior to its deployment, neural text generator 110 is trained to "learn" a manifold of the shared latent space 120 (this is based on an assumption that the codes that make up the shared latent space 120 lie along a low-dimensional manifold). That is, neural text generator 110 is trained to build and iteratively improve upon a model of shared latent space 120, and in doing so requires access to the coded representations of shared latent space 120. Accordingly, as denoted by arrow 122 in FIG. 1, the neural text generator 110 is capable of sampling shared latent space 120 (e.g., by taking a random noise sample from a multinomial Gaussian distribution and feeding it to the generator, which then gives a code, effectively providing a random vector normally distributed from the shared latent space 120). In some embodiments, neural text generator 110 may not only read from shared latent space 120 but can also modify shared latent space 120 such as during a training phase (e.g., in a co-training process where a machine translation computing system is trained for one step or more, then neural text generator 110 is trained for one step or more, and the two training tasks are then repeated, in which case the latent space is modified during the training of the translation system), as represented by arrow 124 in FIG. 1. Subsequently, based on some input, a now-trained neural text generator (the trained generator depicted in FIG. 2 as 110') may be used to generate a vector representing a point in the learned manifold of the shared latent space 120, which may then be decoded into two parallel sentences (e.g., sentences having the same meaning) in the first and second languages L1, L2.

In at least one embodiment where neural text generator 110 comprises a GAN, neural text generator 110 may be considered to have learned the manifold of shared latent space 120 when the generator (see e.g., 410 of FIG. 4) of neural text generator 110 can satisfactorily generate "fake" coded representations that fool the discriminator (see e.g., 420 of FIG. 4) into identifying them as coded representations originating from shared latent space 120 (i.e., a "real" coded representation). To that end, neural text generator 110 undergoes a training phase, as previously mentioned, in which the generator and the discriminator are trained in an adversarial manner: when the discriminator "incorrectly" identifies a fake coded representation as real (the skilled person will understand that in practice that the correctness of an identification is not binary—e.g., the discriminator may emit a confidence score such as a number between 0 and 1 representing how certain it is that a sample is real), the discriminator is penalized, requiring it to improve its identification of fake versus real coded representations; on the other hand, when the discriminator "correctly" identifies a fake coded representation as being fake (i.e., as being generated by the generator module), then the generator is penalized, requiring it to improve on its generation of fake coded representations. Through an iterative methodology of generating fake coded representations, and responsive evaluation of an objective function (e.g., the previously mentioned loss function) between the discriminator module and the generator module based on feedback from the discriminator module, upon convergence the generator module will have learned to generate coded representations that the discriminator cannot distinguish with certainty as originating from the generator module or the shared latent space. The generator will have learned how to produce codes that are in (or close to codes in) the shared space; sampling performed by the generator would be equivalent, at least approximately, to sampling directly from that shared space.

In use, a trained generator module may then generate coded representations similar to those included in the shared latent space 120, which can then be decoded into sentences in two languages using a decoder. In particular, in at least one application, the trained generator neural network can be configured to concurrently generate coded representations in response to a query that can be decoded into sentences in either language.

Examples of in-Use Applications

With respect to in-use applications of neural text generator 100, FIGS. 2A to 2E are block diagrams illustrating examples of systems comprising a text generator in some non-limiting embodiments of the present invention. In these examples, neural text generator 100 is assumed to have been trained (i.e., to have learned the shared latent space 120 of FIG. 1) to an acceptable degree (i.e., when a stopping criterion is reached, typically when weights of the neural network converge, when the loss has converged, or when the performance on a validation set stops improving or worsens), and thus denoted in FIGS. 2A to 2E as 100'. It is noted that the neural text generator 100 may need to be trained (or re-trained) in a custom manner depending on the application, with different training data input to the text generator 100 (and potentially different labelled training data in supervised learning application).

Figure 2A:
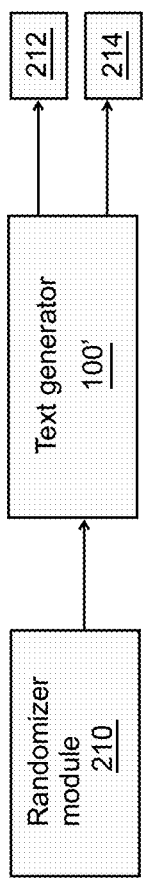
FIGS. 2A to 2E are block diagrams illustrating examples of systems comprising a text generator in some non-limiting embodiments of the present invention.

For the following applications, the approach to training the neural text generator 100 to produce trained neural text generator 100' will typically be the same. Only the inputs to and outputs from trained neural text generator 100' need change. In at least one example implementation, the inputs can comprise a random noise vector, which may or may not be concatenated with another vector depending on the application. For example, in FIG. 2E below, the image decoder 250 processes the image to generate a description of an image as text (e.g. a sequence of words) that describes the image, generates a code representative of the generated text and outputs the code. This code can be concatenated to the random noise vector. The text generator 100' would then output a code that can be subsequently decoded to generate a caption for that image. In that case, the shared latent space 120 would remain the same. Similarly, for queries relating to other applications, each query can be converted to a vector, which can be concatenated to the noise vector. In all cases, the shared latent space 120 includes coded representations text (e.g. sequences of words) as the decoder needed to convert codes to text does not change. The decoder constrains the shared latent space 120 to comprise coded representations of text (e.g. sequence of words): if the decoder is modified, then the shared latent space could include something other than coded representations of text, and the neural text generator could learn accordingly, FIG. 2A is directed to an example implementation of a "free text generation" or "unconditional text generation" mode of text generator 100'. In this mode, text generator 100' mimics the act of a person imagining and expressing a concept in multiple languages, in such a manner of which a truly multilingual person would be capable. In this example, text generator 100' generates equivalent text expressing a certain concept (e.g., sentences having the same meaning) in both a first language L1 and second language L2 and outputs the generated text. To that end, in this implementation, a randomizer module 210 is provided to feed a random input (e.g., noise) to the text generator 100'. Randomizer module 210 may be implemented in the same computing system (e.g., 900 of FIG. 9) that is used for implementing text generator 100', or in another computing system.

In response to the random input provided by randomizer module 210, the text generator 100' generates a first text 212 in the first language L1 and a second text 214 in the second language L2, whereby the second text 214 expresses the same or similar meaning as the first text 212. In particular, based on the random input, neural text generator 110 (FIG. 1) generates a coded representation (e.g., a vector), which effectively is a "sample" of the shared latent space 120 (FIG. 1) given that neural text generator 110 has learned a model of the shared latent space 120. The coded representation can then be decoded into first and second texts 212, 214.

By way of example, in practice, a user may input a command into a user device (e.g., a computer, a mobile phone, etc.) indicative of a request to obtain random equivalent sentences in both first and second languages L1, L2. In response to the user's command, randomizer module 210 feeds the random input to the text generator 100' which, by sampling the shared latent space 120 as previously described and as may be further detailed herein, generates parallel sentences 212, 214.

Figure 2B:
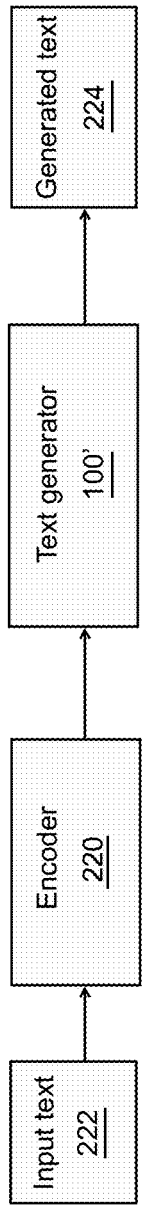

Referring to FIG. 2B, an example implementation of a "conditional text generation" mode of the text generator 100' is depicted. For example, in this mode, text generator 100' generates and outputs text in a given one of the first and second languages L, L2 based on an input text (e.g., an input sentence) that is in the other of the first and second languages L1, L2. More specifically, in this example, an input text 222 in language L1 is input to an encoder 220 that is configured to produce a coded representation corresponding to the input text 222. The coded representation of the input text 222 produced by the encoder 220 is then input to the text generator 100' which uses the coded representation to sample a point in the shared latent space 120 (FIG. 1) and produce generated text 224 (e.g., an output sentence) in language L2. Accordingly, in the conditional text generation mode, text generator 100' may operate as a translator to translate a sentence between the first and second languages L1, L2. It is noted that input text 222 could be in the second language L2 while generated text 224 could be in the first language L1. Encoder 220 may be implemented in the same computing system (e.g., 900 of FIG. 9) that is used for implementing text generator 100', or in another computing system.

Figure 2C:
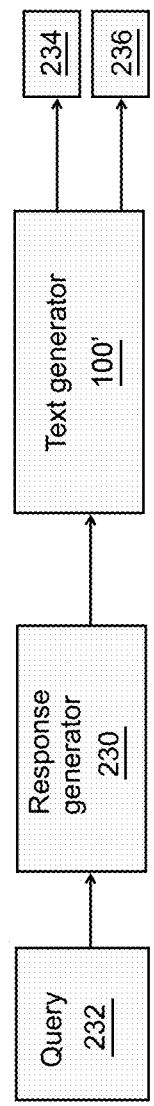

FIG. 2C depicts an example implementation in which the text generator 100' may be used for generating dialogue. For example, text generator 100' may be employed in an application configured to engage in dialogue with a user by providing logical (or meaningful) responses to user queries and/or statements in both first and second languages L1, L2. In this sense, in this example, text generator 100' functions as a multilingual "chatbot". In one example implementation, a response generator 230 is coupled to text generator 100' to feed text generator 100' with an input that text generator 100' can use to sample the shared latent space 120. Response generator 230 may comprise a neural network configured to map a logical response to a given user query or statement 232 that is received by response generator 230. Text generator 100' uses the input from response generator 230 to generate text 234 in the first language L1 and output text 236 in the second language L2. More specifically, based on the input received from response generator 230, a neural text generator 110 (FIG. 1) generates a coded representation, which is effectively a "sample" of the shared latent space 120 (FIG. 1) given that it has learned a model of the shared latent space 120, which is a multi-dimensional space. The coded representation can then be decoded into first and second texts 234, 236.

By way of example, in practice, a user inputs a query or statement 232 into a user device (e.g., a computer, a mobile phone, etc.) in which text generator 100' is implemented. An example of the query or statement 232 could be, for example: "What day is it?" Response generator 230 receives the query or statement 232 and determines a coded version of an appropriate response to be transmitted to text generator 100' which generates the first and second output texts 234, 236 in response. For instance, the first output text 234 may be "Thursday" while the second output text 236 may be "Jeudi", the equivalent in French.

Figure 2D:
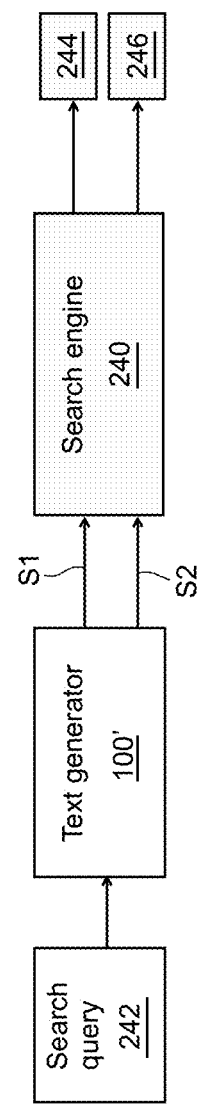

FIG. 2D depicts an example implementation in which the text generator 100' is used for conducting a search, where results are provided in multiple languages concurrently. In this example of implementation, a search engine 240 is coupled to text generator 100'. More specifically, a search query 242 (e.g., as input by a user) is received by search engine 240, which determines a coded version of the text of the search results to be transmitted to text generator 100' which outputs search results 244, 246 in the first language L1 and the second language L2 respectively. This may allow a user to effectively search for results in multiple languages without having to perform separate searches on multiple unilingual search engines.

Figure 2E:
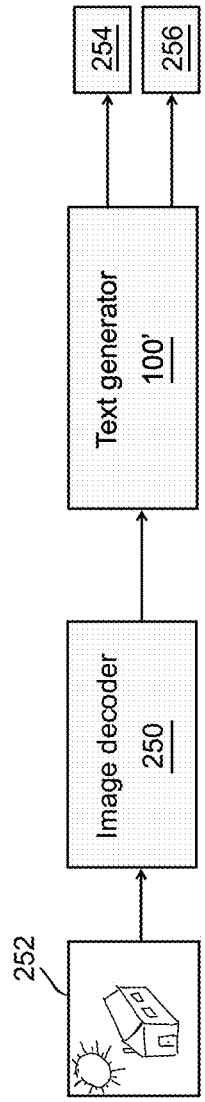

In some embodiments, the input provided to the text generator 100' can be of a type other than text. For instance, FIG. 2E depicts an example implementation in which text generator 100' is used for captioning images in multiple languages. In this example, an image decoder 250 is linked to text generator 100' to provide text generator 100' with an input that the neural text generator 100 (FIG. 1) of text generator 100' can use to sample the shared latent space 120 (FIG. 1). Image decoder 250 may comprise a neural network configured to recognize captionable objects in an image 252. For example, image decoder 250 may comprise a convolutional neural network. The image decoder 250 generates a coded representation of the image 252 and transmits the coded representation (e.g., an "output code") to the text generator 100'. The neural text generator 110 of text generator 100' samples the shared latent space 120 based on the coded representation provided by image decoder 250. In sampling shared latent space 120, neural text generator 110 obtains a coded representation which may then be decoded to generate captions 254, 256 in the first language L1 and the second language L2, respectively.

Example Systems and the Training Thereof

FIG. 3 is a block diagram illustrating components of a system for generating text as contemplated in some non-limiting embodiments of the present invention and shown generally as 300. In this example, text generator 100 operates as part of a broader translator/generator system 300 comprising a neural machine translator 310 that is operable to form, or to assist in building (e.g., in co-operation with a neural text generator 110 of text generator 100), shared latent space 120. In a broad aspect, system 300 is operable to concurrently generate sentences in a first language and a second language. This functionality will be detailed further herein with respect to various embodiments.

In at least one embodiment, neural machine translator 310 forms or otherwise generates a model of shared latent space 120 independently of text generator 100 using machine leaning techniques, typically during a process of training neural machine translator 310. In one example implementation, neural machine translator 310 may be of the type taught in Lample, as previously discussed. In contrast, in at least one variant embodiment, neural machine translator 310 co-operates with a text generator, and in particular with neural text generator 100, to generate a model of shared latent space 120, in a process of concurrently training both neural machine translator 310 and neural text generator 110 of system 300 as an example. Some approaches to building shared latent space 120 in the foregoing manners will now be described in greater detail, with reference to example embodiments.

FIG. 4 further illustrates components in an example implementation of the system of FIG. 3, denoted generally as translator/generator system 400. In accordance with at least one embodiment, as shown in FIG. 4, neural machine translator 310 comprises an autoencoder configured to encode text both in the first language L1 and in the second language L2 to derive shared latent space 120. The autoencoder may be considered to be "shared" in the sense that the same autoencoder is used for encoding (and decoding) text in multiple languages, the first and second languages L1, L2 in this example. The shared autoencoder of the neural machine translator 310 comprises an encoder 430 that learns lower-level, coded representations from training data input to the encoder 430 (e.g., sentences in languages L1 and/or L2), and a decoder 440 that attempts to reconstruct the original training data from the lower-level coded representations. Each of encoder 430 and decoder 440 is implemented using a neural network (also referred to herein as an "an encoder neural network" and a "decoder neural network" respectively). For example, encoder 430 and/or decoder 440 may be implemented as a recurrent neural network.

Generally speaking, the role of an encoder in an autoencoder architecture is to take an input (e.g., embedding vector, which is a mapping of words or phrases to vectors) and produce a lower-level representation (i.e., a latent code) of that input. Meanwhile, the decoder is operable to take the output of the encoder and produce an output that represents its attempt to reconstruct the original input to the encoder. Any difference between the original input at the encoder and the reconstructed output of the decoder may be quantified as a "loss"; a loss function is thus employed, and the encoder and the decoder are trained such that this loss function is minimized. In order that this loss function be minimized, the autoencoder is trained to learn the lower-level coded representations well enough so as to improve the quality of the reconstructed output until it resembles the corresponding input to the encoder.

More specifically, a training data set is used to train the encoder, in an iterative manner, to produce these lower-level coded representations that result in better reconstructions by the decoder. Further, in at least one implementation, noise may be added to the inputs at the encoder (e.g., corrupting the inputs) in an attempt to force the encoder to learn to produce more robust lower-level coded representations for subsequent reconstruction by the decoder. For example, in a sequence of words, adding such "noise" might be effected by dropping a word or switching the order of two words in the sequence of words.

An autoencoder can also be trained in other ways. For instance, in supervised training, two training data sets are provided as ground truths. For example, the first training data set includes sentences in the first language L1, while the second training data set includes sentences in the second language L2 that are known parallel sentences (i.e., sentences having the same meaning) as the sentences in the first training data set. The autoencoder encodes a given sentence from the first training data set and then encodes the corresponding sentence from the second training data set. As these sentences have the same meaning, when encoded by the encoder, it is desirable that the lower-level coded representations of the two sentences be "close" to each other in the manifold representing the corresponding latent space. For example, if lower-level coded representations are represented as vectors, each sentence may be regarded as being mapped to a corresponding point on the manifold representing the corresponding shared latent space, and a distance between the two points can be computed (e.g., using some known distance or similarity measure). Through iterative training of the autoencoder with the remainder of the first and second training data sets, the autoencoder seeks to minimize the distance between corresponding points of the parallel sentences. The supervised training approach may require an extensive amount of training data.

Referring again to FIG. 4, encoder 430 receives input sentences x of the first language L1, the input sentences x being drawn from a distribution $P_x$, and input sentences y of the second language L2, the input sentences y being drawn from a distribution $P_y$. During training, as previously explained, encoder 430 encodes sentences x and y to intermediate, lower-level coded representations or "codes" $c_x$, $c_y$, which mapped to the shared latent space 120. The decoder 440 is operable to subsequently decode these lower-level coded representations to generate sentence reconstructions (x-tilde, y-tilde).

In at least one embodiment, the autoencoder of neural machine translator 310 is trained independently of neural text generator 110, such that shared latent space 120 is formed independently of neural text generator 110. The training process for the autoencoder of neural machine translator 310 typically comprises evaluating at least one of a number of potential types of loss functions, and learning a model that minimizes the corresponding loss based on the input training data.

As previously mentioned, one type of loss function may be used to compute an "autoencoding loss". The autoencoding loss takes into account errors encountered when encoding and decoding in a single language. For example, starting with an input sentence in a first language L1, the encoder produces a lower-level representation (e.g., as a vector) of the input sentence. The decoder attempts to reconstruct the input sentence in the first language L1 based on the lower-level representation. The error between the reconstructed sentence and the original input sentence may be referred to as an autoencoding loss.

Another type of loss function may be used to compute a "cross-domain loss". Starting with an input sentence in the first language L1, the encoder produces a first lower-level representation of the input sentence. A decoder takes this lower-level representation and attempts to reconstruct the input sentence in the second language L2. The reconstructed input sentence is then encoded again by the encoder to obtain a second lower-level representation thereof. The second lower-level representation is then decoded back into the first language L1, in a process that may be generally referred to as "back translation". A comparison between the original input sentence, in first language L1, and the reproduced sentence also in the first language L1 is made; the error between the two sentences that are expected to be in the same language may be referred to as a cross-domain loss.

Another type of loss function may be used to compute an "adversarial loss". Starting with two parallel sentences in the first language L1 and the second language L2, each sentence is encoded by encoder 430 into a vector representing a mapping into the shared latent space 120. Since the sentences have the same meaning, their vector representations in shared latent space 120 should be "close" to each other according to some distance measure; ideally, they define the same point on a manifold representing the shared latent space 120. A discriminator (not explicitly shown in FIG. 4) samples one of the vectors encoded from the parallel sentences and guesses from which of the first language L1 and the second language L2 the vector was encoded. By iteratively penalizing the discriminator and the encoder 430 based on feedback from the discriminator, the distance between the vectors encoded from parallel sentences in the first and second languages L1, L2 should converge to one another during the training process. The adversarial loss, which is to be minimized through training, refers to the distance between the two vectors encoded from the parallel sentences.

To better illustrate the translation functions of neural machine translator 310, a non-limiting example of how a sentence is translated from one sentence to another is outlined below:
1. Take a sentence: "Hello this is Montreal."
2. Convert each word to a one-hot representation:
   [[0 0 0 . . . 1], [0 0 1 . . . 0], [1 0 . . . 0], [0 1 . . . 0] ]
3. Use a lookup table (can be a randomly initialized one or a pre-trained one) to convert the one-hot encodings into embedding vectors for each word of the sentence:
   [[0.1 0.5 . . . −0.1], [−0.1 0.3 . . . 0.3], [0.34 0.51 . . . −0.1], [0.13 0.56 . . . −1.1]]
4. Feed word by word the sentence into the encoder (and identify the language in which to encode) to obtain a series of codes at the end (c1 . . . c4) for each of the words:
   [c1, c2, c3, c4]
5. Feed the codes to the decoder so that it produces a sequence of probability vectors, one for each output word (and identify the language in which to decode):
   [[0.1 0.3 . . . 0.5], [0.04 0.1 . . . 0.3], [0.5 0.1 . . . ], [0.5 0.3 . . . 0.01]] each vector sums to 1
6. Convert each of the probability vectors to a one-hot encoded vector by putting a 1 in the place where the probability is the highest for each vector:
   [[0 0 . . . 1], [0 0 . . . 1], [1 0 . . . 0], [0 0 1 . . . 0]]
7. Convert the one-hot encoded vectors into actual words.
8. Calculate the losses. For the reconstruction loss: compare the output at step 7 with the input at step 1; for the cross-domain loss, between step 1 and step 2, translate the sentence of step 1 into the other language while decoding in the original language at step 5 and compare the output of step 7 with the sentence of step 1; for the adversarial loss, do step 1 for sentences in both languages, collect their respective codes and feed those to the discriminator to identify the origin of the codes.
9. Back-propagate the loss to update the network parameters (e.g. the weights of the neural network used to implement the neural machine translator 310).

Referring again to FIG. 4, neural text generator 110 has access to the shared latent space 120 as formed by the autoencoder of neural machine translator 310, such that, after having been trained, neural text generator 110 is operable to generate coded representations that mimic coded representations of the shared latent space 120. Moreover, by accessing an appropriate decoder (e.g., the decoder 440 of the neural machine translator 310), the coded representations produced by the neural text generator 110 can be subsequently decoded into parallel sentences in the first and second languages L1, L2. The neural text generator 110 can thus generate synthesized parallel sentences (i.e., parallel sentences created with no particular guidance as to sentence structure) in the languages L1, L2 based on the shared latent space 120. Advantageously, this generation of sentences in both first and second languages L1, L2 may be performed concurrently: a sample, being a coded representation that can be subsequently decoded into a sentence, need not be taken from two separate latent spaces corresponding to the two different languages, respectively, to perform bilingual text generation.

In at least one embodiment, the neural text generator 110 is trained independently of the neural machine translator 310. Neural text generator 110 comprises a generative adversarial network (GAN) that includes a generator 410 (also referred to herein as a "code generator") and a discriminator 420 (also referred to herein as a "code discriminator"), each of which is implemented by a neural network. As shown in FIG. 4, the generator 410 is initially configured to randomly sample from a prior distribution N (e.g., a multivariate normal distribution representing random noise z) and to perform mappings to generate codes ĉ, forming a generated distribution. As the GAN is trained, the generated distribution converges to a data distribution of the shared latent space 120. To achieve this result, for its part discriminator 420 is configured to learn to discern samples (e.g. coded representations c) obtained from the data distribution of the shared latent space 120 from the codes ĉ generated by generator 410. In at least one example implementation, the GAN is trained until it the discriminator 420 is likely to fail in identifying codes originating from the shared latent space 120 as being sampled therefrom and/or identifying codes ĉ as having been generated by generator 410, although some other stopping criterion may be used (e.g., after a set amount of iterations, when weights of the neural network converge, when the loss has converged, when performance on a validation set stops improving or worsens, etc.). Generator 410 and discriminator 420 learn to improve one another's respective generative and discriminative performance in an adversarial manner through training. To that end, an adversarial loss function may be employed in training generator 410 and discriminator 420.

Figure 5:
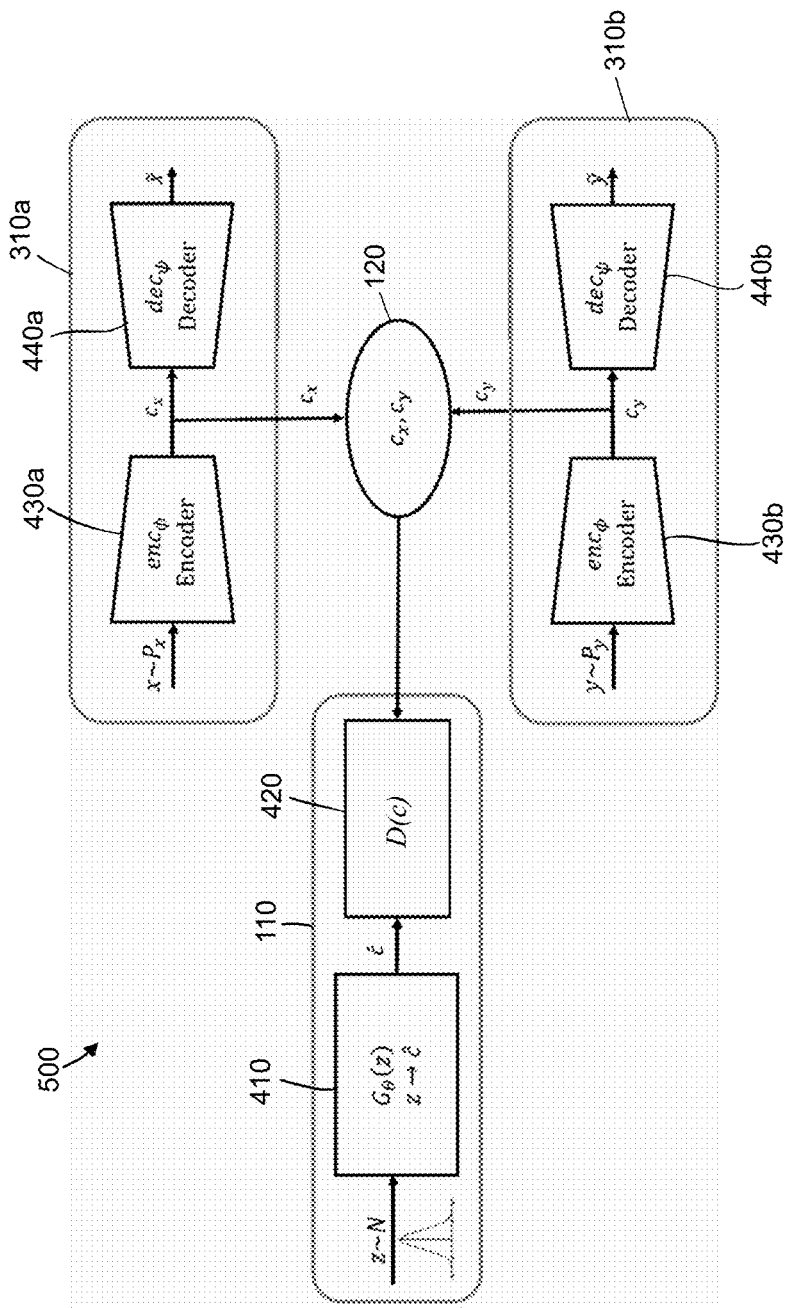
FIG. 5 is a block diagram further illustrating components of the system of FIG. 3 in accordance with at least one other example implementation.

FIG. 5 further illustrates components in an example implementation of the system of FIG. 3, denoted generally as a translator/generator system 500. In accordance with at least one embodiment, there is a single auto-encoder capable of translating between two languages in both directions (e.g., English to French, and French to English), but depicted logically as separate auto-encoding units 310a, 310b as shown in FIG. 5 for illustrative purposes to emphasize the bi-directional translation functionality. In this example, components of the first (logical) autoencoder 310a are associated with a first language L1 while components of the second (logical) autoencoder 310b are associated with the second language L2.

With regard to the functionality of shared autoencoder 310 (see FIG. 4) with respect to language L1 (310a), during training, encoder 430a receives input sentences x of the first language L1, the input sentences x being drawn from a distribution $P_x$, and encodes the input sentences x to intermediate codes $c_x$, which represents the contribution of codes corresponding to language L1 to shared latent space 120; similarly, with regard to the functionality of shared autoencoder 310 with respect to language L2 (310b), encoder 430b receives input sentences y of the second language L2, the input sentences y being drawn from a distribution $P_y$, and encodes the input sentences y to intermediate codes $c_y$, which represents the contribution of codes corresponding to language L2 to shared latent space 120. Moreover, decoder 440a is operable to decode codes $c_x$ encoded by encoder 430a, to generate sentence reconstructions in the first language L1 (x-tilde), whereas decoder 440b is operable to decode codes $c_y$ encoded by encoder 430b, to generate sentence reconstructions in the second language L2 (y-tilde).

The training process for training the shared autoencoder was previously described with regard to FIG. 4.

Figure 6:
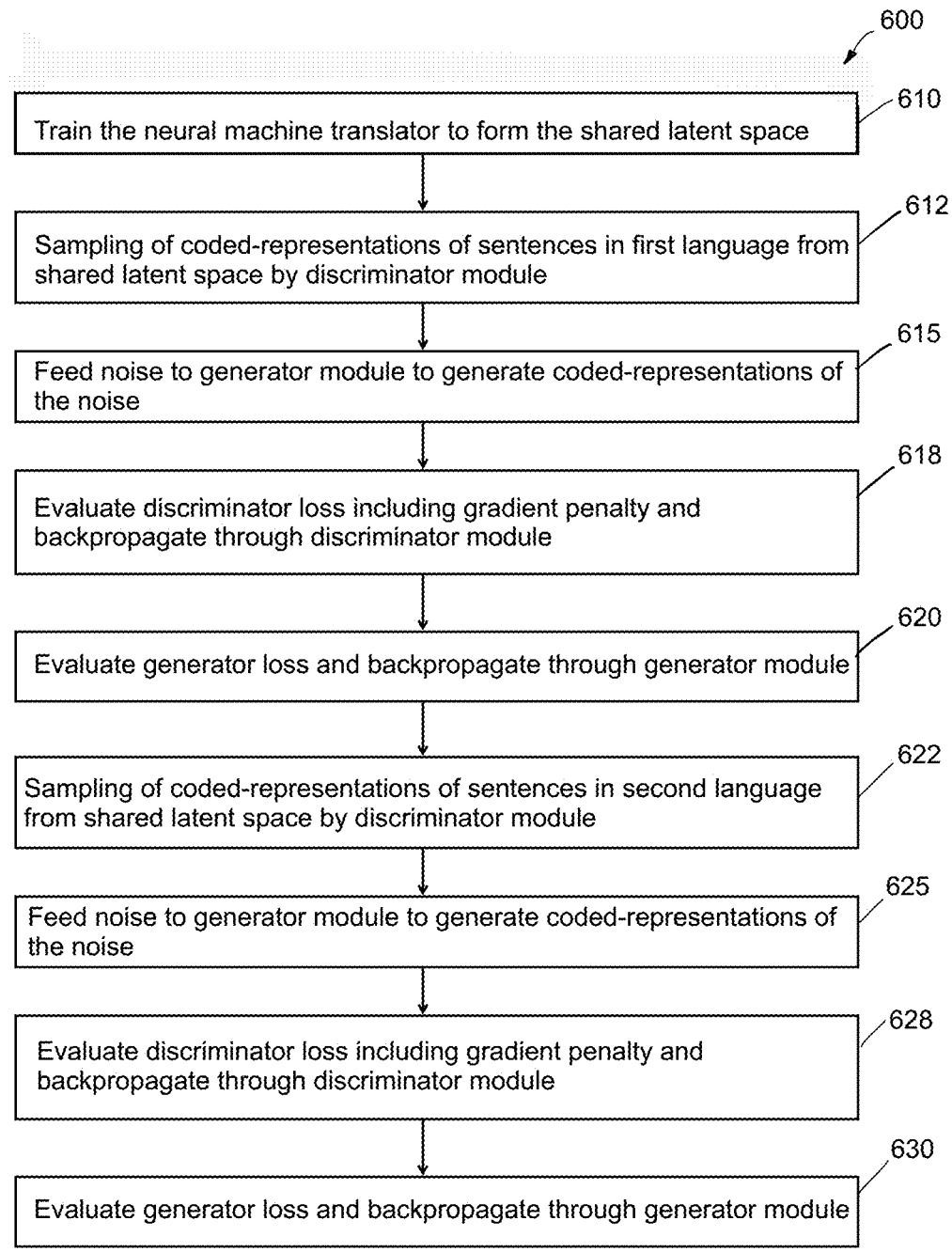
FIG. 6 is a flow diagram illustrating a method of generating text as contemplated in some non-limiting embodiments of the present invention.

FIG. 6 is a flow diagram illustrating a method of generating text as contemplated in some non-limiting embodiments of the present invention, and is shown generally as 600. In one or more embodiments, method 600 or one or more acts thereof may be performed by one or more computing devices or entities. For example, portions of method 600 may be performed by one or more components of the example computing system 900 of FIG. 9, or of another computing system or device. Method 600 or one or more acts thereof may be embodied in computer-executable instructions that are stored in a computer-readable medium, such as a non-transitory computer-readable medium. Some acts or portions thereof in the flow diagram may be omitted or changed in order, depending on the particular implementation.

At 610, a neural machine translator (e.g., a trained machine learning algorithm based on a translation neural network, such as 310 of FIGS. 3 and 4) is trained to form a shared latent space (e.g., 120 of FIG. 3 or 4) as previously described with reference to earlier Figures. In at least this embodiment, the shared latent space is formed and trained independently of a neural text generator (e.g., a generator comprising a generator neural network, such as 110 of FIG. 3), typically prior to the training of the neural text generator, and then linked thereto. In this example scenario, the neural machine translator may thus be considered to have been "pre-trained" to form the shared latent space.

Subsequent acts of method 600 are directed to the training of the neural text generator 110, which has access to the shared latent space 120. In at least one embodiment, the neural text generator 110 includes a GAN that concurrently generates sentences in both a first language L1 and a second language L2.

At 612, the generator 410 of the GAN samples a data point z from a random distribution N and the generator 420 generates a "fake" coded-representation ĉ from the data point z. Then, an "actual vector" representing the random is obtained from the shared latent space 120. For example, the discriminator 420 samples the coded representation of the sentence in the first language L1 as mapped in the shared latent space 120.

A "predicted vector" representing the input object is also generated, using a current model of the multi-dimensional space. For example, to generate the predicted vector, at 615, generator 410 of FIGS. 4, 5 receives a data point z from a random distribution N (see e.g., FIG. 5) and the generator 410 generates a "fake" coded-representation ĉ from the data point z. The prior distribution may be of a form such that the input object fed to the generator 410 represents random noise. The "fake" coded-representation ĉ is then transmitted to the discriminator 420. The discriminator 420 receives the coded representation, and determines, based at least in part on the coded representation sampled at 612, if the fake coded-representation c was sampled from the shared latent space.

Based on the determination made at 616, discriminator 420 evaluates or otherwise generates a loss function by comparing the predicted vector and the actual vector. For example, at 618, a discriminator loss is evaluated, including a gradient penalty thereof. The discriminator loss is then back-propagated through the discriminator module so as to adjust the weights of the neural network of the discriminator module, and thus minimize the discriminator loss in the following training iteration.

At 620, based on the determination made by the discriminator 420, a generator loss function is evaluated and back-propagated through the generator 410 so as to adjust the weights of the neural network of the generator 410, thus training the generator 410.

A similar procedure is then followed for the second language L2. At 622, the discriminator 420 samples the coded-representation of a sentence in the second language L2 mapped in the shared latent space 120. At 625, the generator 420 samples a data point z from prior distribution N and the generator 420 generates a "fake" coded-representation ĉ from the data point z. The prior distribution may represent random noise. The "fake" coded-representation ĉ is then transmitted to the discriminator 420. The discriminator 420 determines, based at least in part on the coded representation sampled at 622, if the "fake" coded-representation ĉ was sampled from the shared latent space 120. Based on the determination, at 628, a discriminator loss is evaluated, including a gradient penalty thereof. The discriminator loss is then back-propagated through the discriminator 420 so as to adjust the weights of the neural network of the discriminator 420 and thus minimize the discriminator loss in the following training iteration. At 630, based on the determination made by the discriminator 420, a generator loss is evaluated and back-propagated through the generator 410 so as to adjust the weights of the neural network of the generator 410.

The acts depicted at 612 to 630 are iteratively repeated until the model of the shared latent space 120 learned by the generator module is satisfactory—i.e., until the discriminator 420 cannot discern a "fake" coded-representation ĉ generated by the generator 410 from a "real" coded-representation sampled from the shared latent space 120. Other stopping criterion may be employed in variant embodiments.

Figure 7:
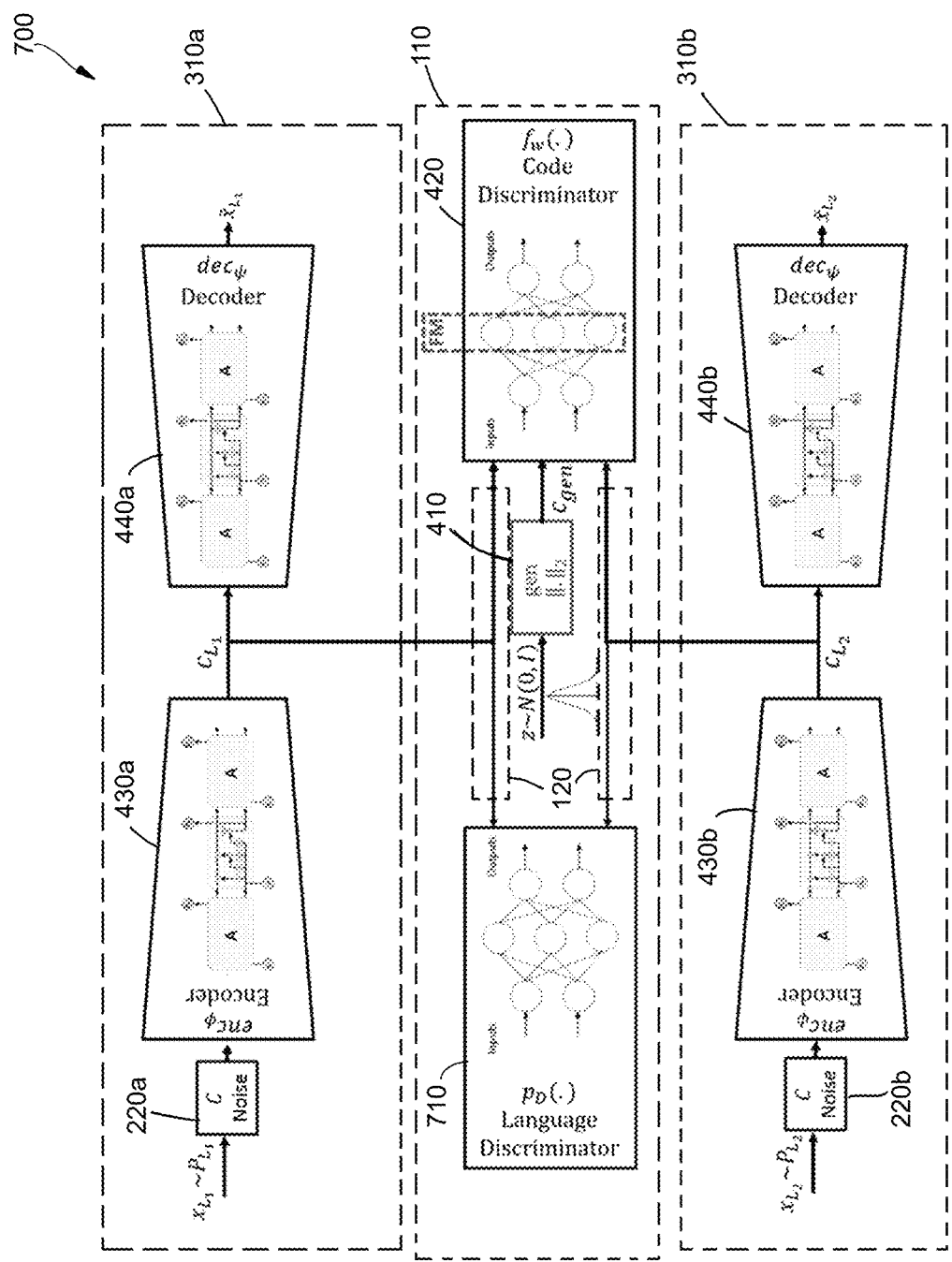
FIG. 7 is a block diagram illustrating components of a system for generating text as contemplated in some non-limiting embodiments of the present invention.

FIG. 7 further illustrates components in another example implementation of the system of FIG. 3, denoted generally as a translator/generator system 700. In a broad aspect, system 700 comprises multiple neural networks, including both neural machine translator and neural text generator components, that are coupled to each other and concurrently trained, so as to allow the neural text generator to learn the manifold on which codes of the shared latent space would lie, and to use that learned model in subsequent text generation functions. As the multiple neural networks are "co-trained", however, an explicit data structure is not required to store the codes, in contrast to the system 500 of FIG. 5.

For example, in accordance with at least one embodiment, system 700 is configured such that the shared latent space 120 is formed through co-operation between a shared autoencoder (shown logically for two languages as 310a, 310b) and a neural text generator 110. In other words, in contrast with the embodiment described with reference to FIG. 5, in this embodiment, the shared latent space 120 is not only formed on the basis of feedback from the shared autoencoder (i.e., the neural machine translator 310) but also from the neural text generator 110. The co-operative interactions between the neural machine translator 310 and the neural text generator 110 to train one another in generating codes for the shared latent space 120 (which may generally be referred to herein as a "co-training" process) may result in more accurate coded-representations being mapped to the shared latent space 120 and overall improved performance of system 700.

In this example implementation, the system 700 comprises a shared autoencoder shown logically as 310a, 310b, as similarly described in relation to FIG. 5. Each of the (logical) autoencoders 310a, 310b also comprises a respective (logical) noise module 220a, 220b for introducing noise (e.g., dropping random words, switching the order of words) into sentences $x_{L1}$, $x_{L2}$ before encoding thereof by encoders 430a, 430b. As discussed above, introducing noise into the input sentences may result in more robust coded-representations by the encoders 430a, 430b. The encoders 430a, 430b encode the sentences $x_{L1}$, $x_{L2}$ into coded-representations $c_{L1}$, $c_{L2}$ to form the shared latent space 120.

In this example implementation, the neural text generator 110 comprises generator 410, discriminator 420 and a language discriminator module 710. As previously discussed in relation to FIG. 5, generator 410 is configured to generate coded-representations ($c_{gen}$ in FIG. 7) of samples z from prior distribution N. However, in this embodiment, the generator 410 normalizes the samples z.

For its part, in a manner similar to that previously described in relation to FIG. 5, discriminator 420 is configured to learn to discern coded-representations $c_{L1}$, $c_{L2}$ from the data distribution of shared latent space 120 from the new data instances $c_{gen}$ generated by generator 410. However, in this embodiment, discriminator 420 has a feature matching layer. Furthermore, in this embodiment, the discriminator 420 implements an IWGAN objective function.

Language discriminator module 710 is configured to discern if coded representations $c_{L1}$, $c_{L2}$ of parallel sentences from first and second languages L1, L2, sampled from the shared latent space 120, were encoded from sentences in the first language L1 or the second language L2 (e.g., whether the coded representations originated from encoder 430a or encoder 430b). Based on feedback from language discriminator module 710, the system 700 can thus be trained such that coded representations $c_{L1}$, $c_{L2}$ of parallel sentences converge to the same point on a manifold on which codes populating the shared latent space 120 lie. Language discriminator module 710 is implemented by a neural network.

Figure 8:
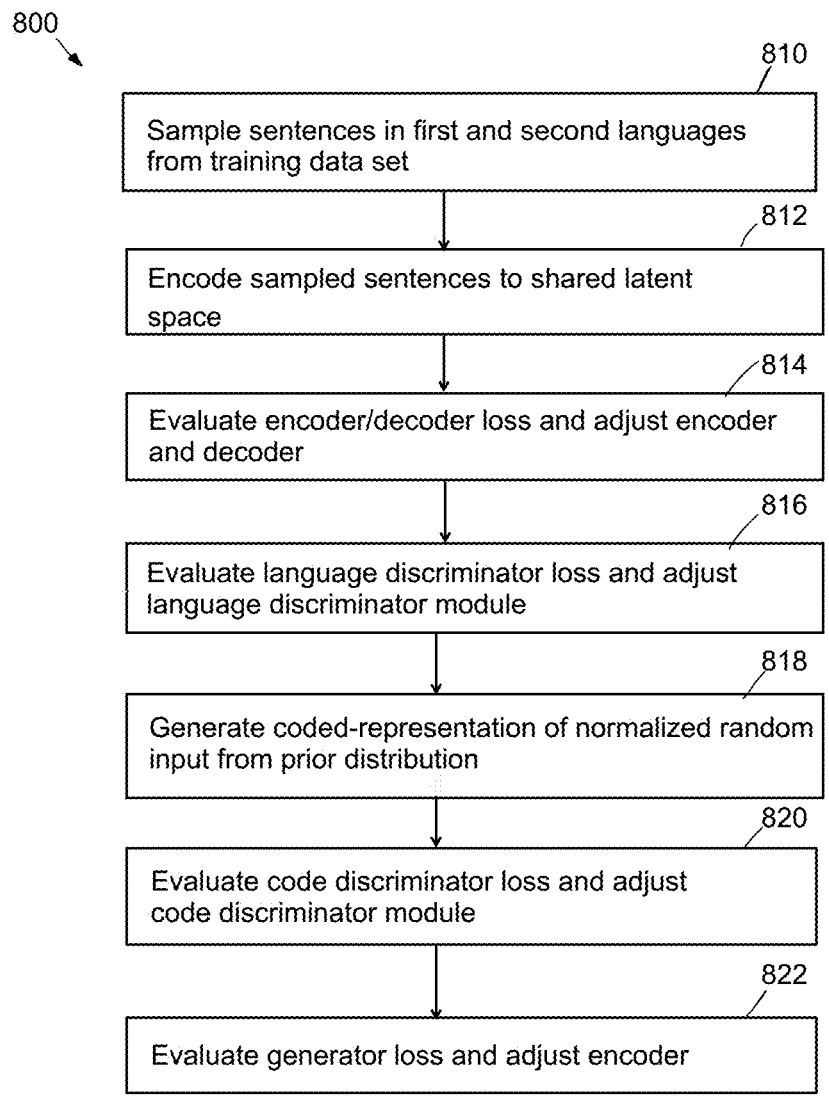
FIG. 8 is a flow diagram illustrating a method of training a system for generating text as contemplated in some non-limiting embodiments of the present invention.

FIG. 8 is a flow diagram illustrating a method of training a system for generating text as contemplated in some non-limiting embodiments of the present invention, and is shown generally as 800. In one or more embodiments, method 800 or one or more acts thereof may be performed by one or more computing devices or entities. For example, portions of method 800 may be performed by one or more components of the example computing system 900 of FIG. 9, or of another computing system or device. Method 800 or one or more acts thereof may be embodied in computer-executable instructions that are stored in a computer-readable medium, such as a non-transitory computer-readable medium. Some acts or portions thereof in the flow diagram may be omitted or changed in order, depending on the particular implementation.

Method 800 comprises acts to co-train a system of generating text, such as system 700 of FIG. 7. In at least this embodiment, the shared latent space is formed and trained in a co-operative manner between a neural text generator (e.g., 110 of FIG. 7) and a neural machine translator (e.g., 310a, 310b of FIG. 7). The neural text generator and the neural machine translator may thus be considered to have been "co-trained" to form the shared latent space.

At 810, autoencoders (e.g., 310a, 310b of FIG. 7) sample sentences in the first and second languages L1, L2 from a training data set.

At 812, encoders (e.g., 430a, 430b of FIG. 7) of the autoencoders encode the sentences sampled at 810 and map the now-coded-representations $c_{L1}$, $c_{L2}$ thereof to a shared latent space (e.g., 120 of FIG. 7). Based on the sampled sentences and the coded representations $c_{L1}$, $c_{L2}$ thereof, at 814, an encoder/decoder loss function is evaluated and encoders and decoders are trained to minimize the encoder/decoder loss.

At 816, a language discriminator loss function is evaluated based on the coded representations $c_{L1}$, $c_{L2}$. More specifically, a distance between coded representations $c_{L1}$, $c_{L2}$ is indicative of the language discriminator loss. Based on evaluations of the language discriminator loss function, language discriminator module (e.g., 710 in FIG. 7) is trained to minimize the language discriminator loss.

At 818, a generator (e.g., 410 in FIG. 7) generates a coded representation $c_{gen}$ of a normalized random input z from prior distribution N. The distribution N can be chosen to be of a specific type (e.g., a Gaussian distribution) such that, during training, the distribution N is imposed to the shared latent space.

The discriminator 420 attempts to discern the generated coded representation $c_{gen}$ generated by the generator module 410 from the coded representations $c_{L1}$, $c_{L2}$ of the shared latent space 120. Based on the comparison, a code discriminator loss function is evaluated at 820, and the discriminator 420 is trained to minimize the discriminator loss for the next training iteration.

At 822, a generator loss function of the generator 410 is evaluated and the encoders 430a, 430b are trained to minimize the generator loss.

The acts depicted at 810 to 822 are iteratively repeated until the model of the shared latent space 120 learned is satisfactory or some other stopping criterion is reached, as mentioned previously.

Figure 9:
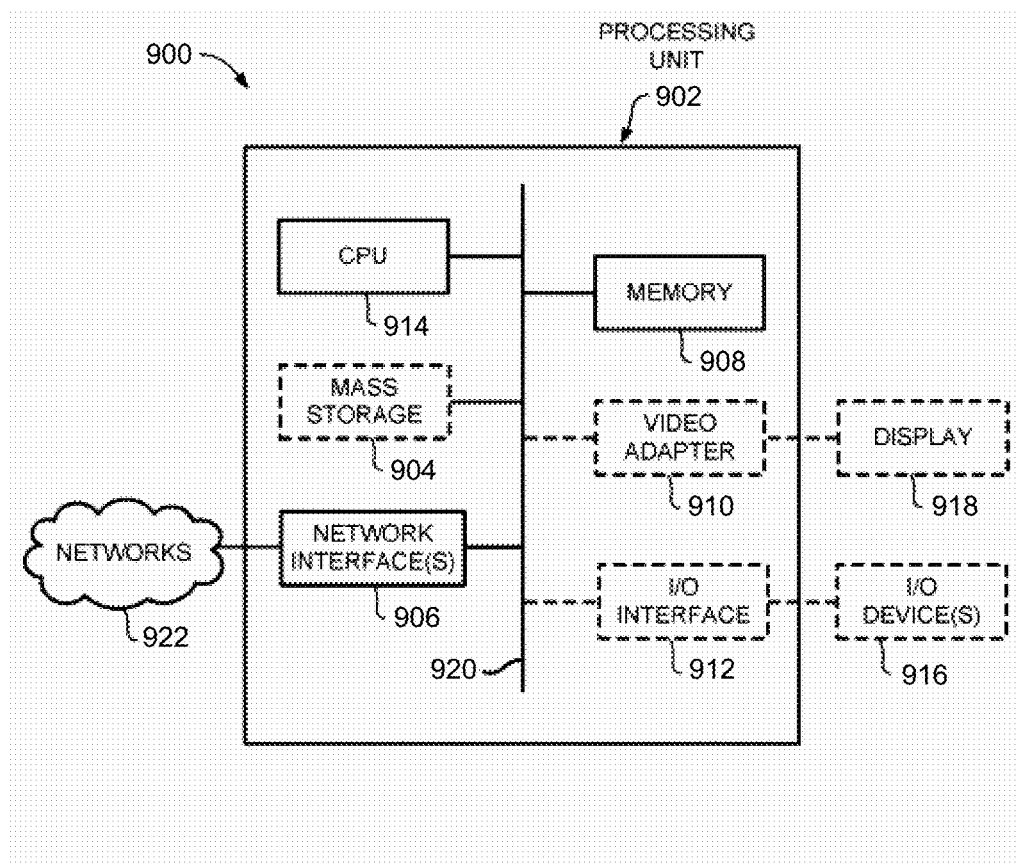
FIG. 9 is a block diagram illustrating components of a computing device upon which at least some acts of a method of generating text as contemplated in some non-limiting embodiments of the present invention may be performed, in accordance with at least one example implementation.

FIG. 9 is a block diagram illustrating components of a computing device, or more generally a computing system, shown generally as 900, upon which at least some acts of a method of generating text as contemplated in some non-limiting embodiments of the present invention may be performed in accordance with at least one example implementation. Specific device implementations may utilize all of the components shown or a subset of the components, and levels of integration may vary from device to device. Furthermore, a device may contain multiple instances of a component, such as multiple processing units, processors, memories, transmitters, receivers, etc.

The computing system 900 comprises at least one processing unit 902. Processing unit 902 may comprise a central processing unit (CPU) 914, a bus 920, and/or memory 908, and may optionally also comprise a mass storage device 904, a video adapter 910, and/or an input/output (I/O) interface 912 (shown in dashed lines). Those skilled in the art will appreciate that the CPU 914 is generally representative of a processing capability. In some embodiments, in place of a conventional CPU, a specialized processing core may be provided. For example, a Graphic Processing Unit (GPU), Tensor Processing Unit (TPU), and/or other so-called accelerated processors (or processing accelerators) may be provided in addition to or in place of CPU 914.

The CPU 914 may comprise any type of electronic data processor. The memory 908 may comprise any type of non-transitory system memory such as static random access memory (SRAM), dynamic random access memory (DRAM), synchronous DRAM (SDRAM), read-only memory (ROM), or a combination thereof. For example, memory 908 may comprise ROM for use at boot-up, and DRAM for program and data storage for use while executing programs. The bus 920 may be one or more of any type of several bus architectures including a memory bus or memory controller, a peripheral bus, and/or a video bus.

The mass storage 904 may comprise any type of non-transitory storage device configured to store data, programs, and other information and to make the data, programs, and other information accessible via the bus 120. The mass storage 904 may comprise, for example, one or more of a solid state drive, hard disk drive, a magnetic disk drive, and/or an optical disk drive.

The video adapter 910 and the I/O interface 912 may provide interfaces to couple external input and output devices to the processing unit 902. Examples of input and output devices may include a display 918 coupled to the video adapter 910 and an I/O device 916 such as a touchscreen coupled to the I/O interface 912. Other devices may be coupled to the processing unit 902, and additional or fewer interfaces may be utilized. For example, a serial interface such as Universal Serial Bus (USB) (not shown) may be used to provide an interface for an external device.

The processing unit 902 may also comprise one or more network interfaces 906, which may comprise at least one of wired links, such as an Ethernet cable, and/or wireless links to access one or more networks 922. The network interfaces 906 may allow the processing unit 902 to communicate with remote entities via the networks 922. For example, the network interfaces 906 may provide wireless communication via one or more transmitters/transmit antennas and one or more receivers/receive antennas. The processing unit 902 may be in communication with a local-area network or a wide-area network for data processing and communications with remote devices, such as other processing units, the Internet, or remote storage facilities.

In at least one variant embodiment, the methods described herein may be adapted to operate in an unsupervised, semi-supervised, and/or supervised manner.

While embodiments described herein have primarily referred to translation between and generation of text in two languages (i.e., bilingual translation and/or generation), this has been primarily done for ease of exposition. In certain implementations, systems and methods configured to work with multiple languages can be specifically adapted to work with exactly two languages. However, in other implementations, modifications may be made to the embodiments of the methods and systems described herein to accommodate more than two languages.

While embodiments described herein employ a text generator that comprises a neural network, in variant embodiments, a text generator not comprising a neural network may be employed so long as the text generator is capable of obtaining a code from the shared latent space for subsequent decoding.

In the context of the present specification, "device" is any computer hardware that is capable of running software appropriate to the relevant task at hand. Thus, some (non-limiting) examples of devices include personal computers (desktops, laptops, netbooks, etc.), smartphones, and tablets, as well as network equipment such as routers, switches, and gateways. It should be noted that a device acting as a device in the present context is not precluded from acting as a server to other devices. The use of the expression "a device" does not preclude multiple devices being used in receiving/sending, carrying out or causing to be carried out any task or request, or the consequences of any task or request, or acts of any method described herein.

In the context of the present specification, the expression "component" is meant to include software (appropriate to a particular hardware context) that is both necessary and sufficient to achieve the specific function(s) being referenced.

In the context of the present specification, the expression computer-readable medium is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", etc. have been used as adjectives only for the purpose of allowing for distinction between the nouns that they modify from one another, and not for the purpose of describing any particular relationship between those nouns. Thus, for example, it should be understood that, the use of the terms "first" and "second" as modifiers for a component is not intended to imply any particular order, type, chronology, hierarchy or ranking (for example), nor is their use (by itself) intended imply that any "second" component must necessarily exist in any given situation. For example, reference to a "first" component and a "second" component does not preclude the two components from being implemented in the same actual real-world element or device. Thus, for example, in some instances, a "first" component and a "second" component may be implemented in the same software and/or hardware; in other cases they may be implemented in different software and/or hardware.

Although example embodiments have been described herein, the various features and acts may be combined, divided, omitted, rearranged, revised or augmented differently in variant embodiments, depending on the specific outcome or application. Various elements herein have been described as "A and/or B," which is intended to mean any of the following "A or B," "A and B," "one or more of A and one or more of B."

Modifications and improvements to the above-described implementations of the present invention may become apparent to those skilled in the art. The foregoing description is intended to be exemplary rather than limiting. The scope of the present invention is therefore intended to be limited solely by the scope of the appended claims.

The invention claimed is:

1. A system for concurrently generating parallel texts in at least two different languages, the system comprising:
   one or more processors;
   one or more computer-readable media storing computer-executable instructions; and
   wherein the instructions, when executed by the one or more processors, causing the one or more processors to implement a neural machine translator and a generative adversarial network;
   wherein the neural machine translator comprises:
      a shared latent space including a plurality of coded representations, each of the plurality of coded representations mapping to a set of parallel texts in the at least two different languages, wherein each set of parallel texts includes texts in each of the at least two different languages, wherein each text included in each set of parallel texts has the same meaning; and
      an autoencoder comprising:
         an encoder configured to receive sample text in a first language of the at least two different languages and output a coded representation from the plurality of coded representations of the shared latent space which maps to one of the sets of parallel texts that includes the sample text in the first language and text in a second language which has the same meaning as the sample text; and
         a decoder configured to receive the coded representation and output the text in the second language; and
   wherein the generative adversarial network comprises a generator and a discriminator, the generator configured to receive noise and generate a fake coded representation of text in the first language of the at least two different languages, conditioned on the noise, that mimics a coded representation of the plurality of coded representations included in the shared latent space, the discriminator configured to receive the fake coded representation from generator and the coded representation from the encoder and provide feedback to the generator for use in learning to generate the fake coded representations.

2. The system of claim 1, wherein the autoencoder is pre-trained using a training dataset comprising texts in each of the at least two different languages and a loss function to learn the plurality of coded representations included in the shared latent space.

3. The system of claim 1, wherein the discriminator is configured to:
produce a confidence score representing how certain the discriminator is that the fake coded representation is the coded representation received from the encoder.

4. The system of claim 1, wherein the generator and the discriminator each comprise a neural network.

5. The system of claim 4, wherein the discriminator is configured to provide feedback to the generator for use in learning to generate fake coded representations by evaluating a discriminator loss and back-propagating a gradient penalty of the discriminator loss to optimize parameters of the discriminator and by evaluating a generator loss and back-propagating a gradient penalty of the generator loss to optimize parameters of the generator.

6. The system of claim 1,
wherein the encoder receives the sample text in a first language from a training dataset comprising sample texts in each of the at least two different languages that is used to train the autoencoder to learn the plurality of coded representations included in the shared latent space.

7. The system of claim 1, wherein the encoder is further configured to receive sample text in the second language of the at least two different languages and output a coded representation from the plurality of coded representations of the shared latent space which maps to one of the sets of parallel texts that includes the sample text in the second language and text in the first language which has the same meaning as the sample text in the second language; and the decoder is further configured to receive the coded representation and output the text in the first language; and wherein generator is configured to receive noise and generate a second fake coded representation of text in the second language, conditioned on the noise, that mimics a coded representation of the plurality of coded representations included in the shared latent space, and the discriminator is further configured to receive the second fake coded representation from generator and the coded representation from the encoder and provide feedback to the generator for use in learning to generate fake coded representations.

8. The system of claim 7, wherein the encoder and decoder each comprise a neural network.

9. The system of claim 7, wherein the noise is sampled from a Gaussian distribution.

10. The system of claim 7, wherein each text included in each set of parallel texts is a sequence of words or a sentence.

* * * * *